United States Patent Office 3,777,013
Patented Dec. 4, 1973

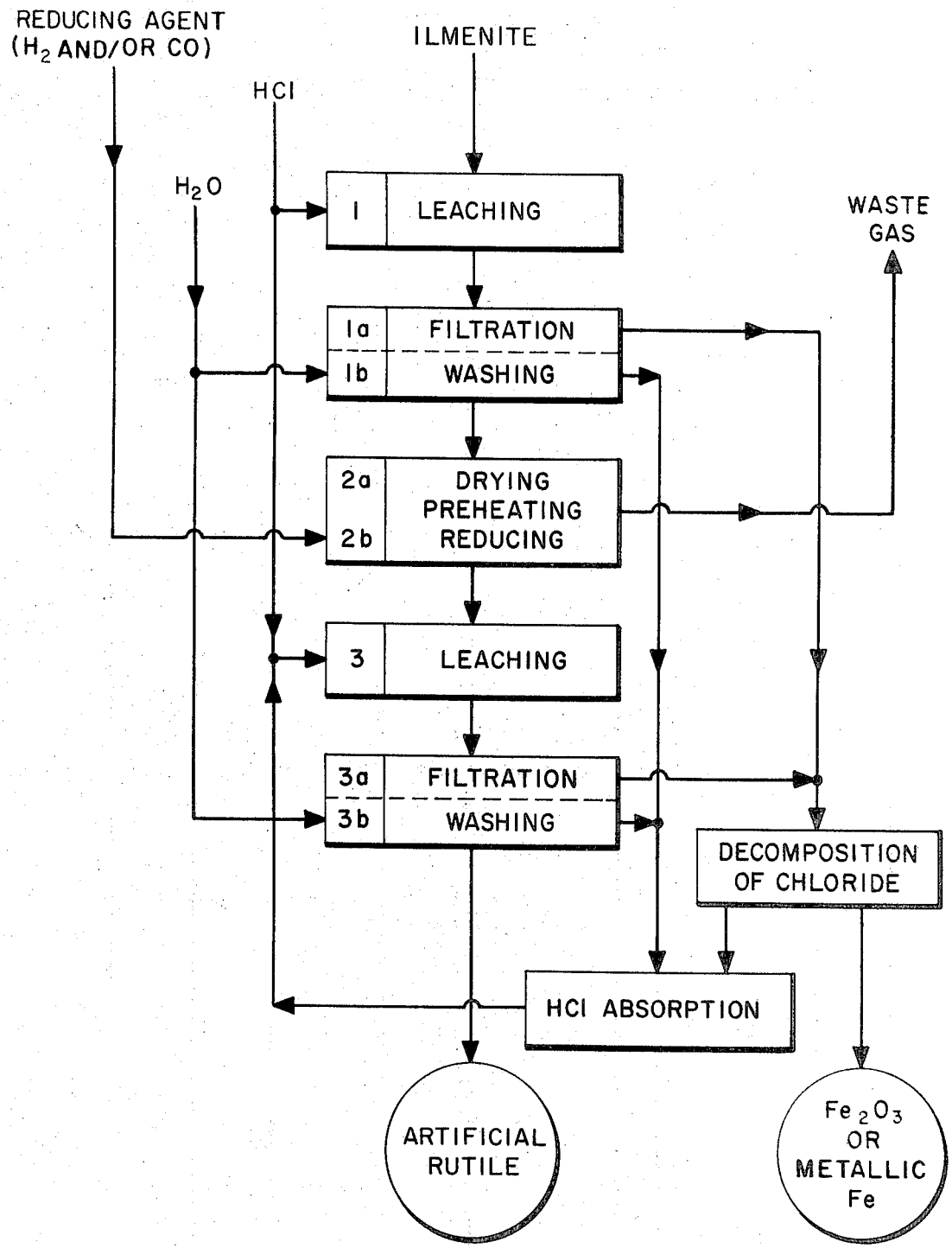

3,777,013
PROCESS FOR THE PREPARATION OF SYNTHETIC RUTILE STARTING FROM ILMENITE
Arrigo Soverini, Giuseppe Sironi, and Raffaele Arezzi, Novara, Italy, assignors to Montecatini Edison S.p.A., Milan, Italy
Filed May 12, 1971, Ser. No. 142,517
Claims priority, application Italy, May 13, 1970, 24,547/70
Int. Cl. C01g 23/04; C22b 3/00, 53/00
U.S. Cl. 423—610
3 Claims

ABSTRACT OF THE DISCLOSURE

A process is disclosed for the preparation of synthetic rutile starting from ilmenite, characterized in that it comprises a pre-leaching of the ilmenite with hydrochloric acid, followed by a reduction of the pre-leached product to convert to ferrous oxide the higher iron oxides therein, and a second leaching with hydrochloric acid.

---

The present invention relates to a process for the preparation of synthetic rutile, starting from ilmenite, by the separation of the iron oxides from the ore. The thus obtained synthetic rutile is suitable for producing a $TiCl_4$ which may be easily purified. It contains at least 90% by weight of $TiO_2$, less than 1.5% of Fe, and less than 2% of other metallic oxides, silica excepted.

Several processes are known for obtaining synthetic rutile, starting from ilmenite, by the separation of the iron oxides. The modern processes involving leaching with HCl may be divided into two groups:

(a) processes for only leaching with HCl at various concentrations
(b) processes for leaching ilmenite in which the iron has been reduced to FeO or Fe.

Processes of type (a) involve remarkably high losses of $TiO_2$; while those of type (b) reach higher titers, but are more expensive.

An object of the present invention is that of providing a process for the preparation of synthetic rutile, starting from ilmenite, and showing definite advantages over the prior art.

In accordance with the present invention, the process for the preparation of synthetic rutile, starting from ilmenite, is characterized in that it comprises a pre-leaching of ilmenite with hydrochloric acid, followed by a reduction to convert the higher iron oxides to lower iron oxides and then by a second leaching with hydrochloric acid.

The pre-leaching effects the elimination of all the iron contained in the ore such as FeO and part of the other metals such as Ca, Mg, Mn and Al, thus attaining a considerable saving of heat and of reducing agent in the succeeding reducing stage, and brings about a high increase of the material reactivity, inasmuch as the value of the specific surface of the granules appears to be increased at least 10 times. Therefore, this leaching-activation enables one to carry out the reduction of the higher iron oxides to FeO with times and temperatures lower than those which are usually necessary for those operations.

These and other advantages are attained by the process which is the object of the present invention, and which is characterized by the following steps described with reference to the accompanying drawing:

(1) the ilmenite is pre-leached with hydrochloric acid (15–25%) at a temperature between 90° and 110° C., in order to solubilize ferrous oxide. The resulting suspension or slurry is subjected to filtration or centrifugation, from which a solid phase is obtained that is washed with water;

(2) the solid phase from the preceding stage, after drying and pre-heating, is treated with a reducing gas, containing hydrogen and/or carbon monoxide, at a temperature of 650°–900° C., in order to reduce to ferrous oxide all of the higher iron oxides;

(3) the reduced solid phase from the preceding stage is leached, at a temperature between 80° and 110° C., with hydrochloric acid (15–25%) to solubilize the ferrous oxide resulting from the reduction treatment, as well as a further fraction of the oxides of the other metals. The resulting suspension or slurry is filtered or centrifuged. A purified solid phase is thus obtained which, after washing and drying, forms the synthetic rutile product containing more than 90% of titanium dioxide.

The pre-leaching step is carried out on the ilmenite ore as such, as it is available on the market, at the temperature of 90°–110° C. The concentration of hydrochloric acid (15–25% by weight) and the time required for the operation (2–5 hours) are selected depending on the characteristics of the ore used (composition, particle size).

The hydrochloric acid is used in quantities corresponding to 120–180% of the stoichiometric amount calculated on the basis of the content of FeO and of the other metallic oxides which may be attacked (except $TiO_2$) present in the ore.

The acid leaching operation may be carried out, for instance, in a closed reactor provided with a reflux-condenser and with a stirrer. This reactor is fed with the hydrochloric acid which is brought to the desired temperature. It is subsequently fed with the ore to be treated and the obtained suspension or slurry is kept at the predetermined temperature, under effective stirring, for the predetermined time.

At the end of the pre-leaching, the suspension or slurry is either filtered or centrifuged, thus separating the solid phase, consisting of the pre-leached ilmenite (in which the $TiO_2$ concentration may have an increase of more than 50%), from the solution containing ferrous chloride, the chlorides of the other attacked oxides and the excess of hydrochloric acid. This separated solution may be treated for the recovery of the hydrochloric acid and to obtain the metallic Fe or $Fe_2O_3$.

The cake thus obtained from the filter or centrifuge retains a quantity of solution ranging from 10 to 20% of its total weight, according to whether the separation is carried out by centrifugation or by filtration. The cake may be washed either continuously (for instance, with Dorr pulsating columns) or discontinuously, in this latter case water being employed in a quantity corresponding to 2–3 times the weight of the cake.

A material balance of the pre-leaching step with regard to the principal elements shows that the impurities are eliminated from the starting ilmenite ore in the following percentages:

| Total | Percent |
|---|---|
| Fe | 60–80 |
| MnO | 65–75 |
| MgO | 45–65 |
| CaO | 20–50 |
| $Al_2O_3$ | 20–60 |

The pre-leaching step gives rise in the treated ore to an increase of the specific surface by an amount which may attain a value up to 70 times greater than the starting one. The particle size of the pre-leached ilmenite is practically equal to that of the starting material.

By treatment with hot gases, the pre-leached ilmenite is dried and brought generally above 300° C. It is then fed into a fluid bed reactor and there treated with a reducing gas at 650°–900° C. for 10–120 minutes in order to reduce $Fe_2O_3$ to FeO.

The necessary volume of the reducing gas depends on the composition and on the concentration of the gas itself, on the temperature, on the composition, on the particle size of the ore, etc.

A gas, no matter how produced, containing hydrogen and/or carbon monoxide, may be used as the reducing gas. If hydrogen or carbon monoxide at high concentration (higher than 90%) is used, the reduction is very rapid.

With pure hydrogen, at the temperature of 750°–850° C. and for 20–10 minutes, a reduced product is obtained in which iron is present to the extent of 94–96% as $Fe^{++}$ and to the extent of 1–5% as metallic Fe, the difference (to 100%) consisting of $Fe^{+++}$.

With pure carbon monoxide, at 820° C. and for 25 minutes, a reduced product is obtained in which iorn is present to the extent of 90% as $Fe^{++}$, and to the extent of less than 0.1% as metallic Fe, the difference (to 100%) consisting of $Fe^{+++}$.

The reducing gas may also be produced by injecting directly into the reducing reactor a fuel (natural gas or oil) and oxygen (or optionally air) in such ratios as to give rise to a partial combustion, with the consequent formation of a gas containing $H_2$, CO, $H_2O$, $CO_2$ and optionally $N_2$. This gas must have a reducing power, expressed as the molar ratio $H_2+CO/H_2O+CO_2$, higher than 2. The reducing gas thus produced requires a longer reaction time and higher temperatures (800°–900° C.) than when hydrogen or pure carbon monoxide is used.

When the reducing gas is produced in the above-mentioned manner, the gas flowing out of the reducing reactor may be used, after having been subjected to a further combustion, for pre-heating the pre-leached ilmenite.

At the end of the reduction the treated ore, after cooling down to a temperature of 100° C., is discharged into the reactor for a final leaching, which may have for instance operating characteristics similar to those of the pre-leaching reactor.

The operating procedures are similar. Hydrochloric acid (15–25% by weight) is used in quantities corresponding to 150–200% of the stoichiometric amount calculated on the amount of the metals present, titanium excepted. The leaching operation is carried out at 80–110° C., for a period of time of 2–4 hours.

At the end of the leaching, the resulting suspension or slurry is filtered or centrifuged, thereby separating the solid phase (synthetic rutile) from the solution of ferrous chloride. The leaching solution may be added to the one coming from the pre-leaching step and treated together with it for the recovery of the hydrochloric acid.

In this last attack with HCl, the residual iron is removed from the reduced ilmenite to the extent of about 95%, while other impurities are solubilized to a variable extent, according to their concentrations in the treated ore, thus obtaining solubilization of Ca, Mg, Mn and Al to an extent ranging from 20 to 70%.

The separated cake is washed with water in order to remove the retained leaching liquid, and finally dried.

The synthetic rutile thus obtained contains at least 90% by weight of $TiO_2$, less than 1.5% of Fe and less than 2% of other metallic oxides which may be chlorinated, excepting $SiO_2$, in a subsequent chlorination step.

The granulometric composition of the synthetic rutile obtained according to the process described herein is practically the same as that of the starting ore.

The leaching solutions, containing the solubilized chlorides and the excess of hydrochloric acid, may be treated according to any one of the per se known techniques for the regeneration of hydrochloric acid. For example, they may be treated with hot air at a temperature between 400° and 700° C. to decompose the chloride by thermal hydrolysis, thus obtaining ferric oxide and hydrochloric acid and steam; these latter are removed in suitable columns, thus restoring the leaching solutions.

The hydrochloric acid may be regenerated according to another process consisting essentially of the crystallization of $FeCl_2 \cdot 4H_2O$, dehydration to $FeCl_2 \cdot 2H_2O$ and reduction with hydrogen at about 800° C., thus producing metallic iron and hydrochloric acid which is recovered by removal with water.

The removal of hydrochloric acid may be carried out with the solutions coming from the washings of the cakes obtained from the filtrations (or centrifugations) following the two leachings. In this way the hydrochloric acid solutions necessary to carry out the two leachings are regenerated.

The process according to the present invention shows the folowing advantages with respect to the known processes of reduction and leaching:

minor consumption of fuel for the preheating since a part of the iron, namely iron in the form of FeO, is removed during the pre-leaching;

minor consumption of reducing agent in the reduction phase, inasmuch as only $Fe_2O_3$ originally presently is reduced; smaller dimensions of the reduction equipment;

high reduction rate, owing to the greater specific surface of the pre-leached ore;

possibility of treating ilmenites with a high content of Ca and/or Mg in the oxidizing and reducing treatments at high temperature;

possibility of carrying out the reduction with temperatures and times lower in comparison with those required when operating with non pre-leached ilmenite;

possibility of obtaining a synthetic rutile having a particle size practically equal to that of the starting materials and low content of Ca and Mg, which allows effective fluid bed chlorination for the preparation of of $TiCl_4$.

The characteristics, the advantages, and the possible applications of the process according to the present invention, will be more clearly understood by means of the following examples, taken in conjunction with the accompanying drawing:

EXAMPLE 1

An ilmenite from Australia was processed. This had the following characteristics:

Specific surface=3.4 m.$^2$/g.

Particle size

| Mm.: | Percent |
|---|---|
| >0.25 | 7.3 |
| 0.25–0.149 | 44.8 |
| 0.149–0.102 | 44.2 |
| 0.102–0.075 | 3.0 |
| 0.075–0.044 | 0.5 |
| <0.044 | 0.2 |

Composition

| | |
|---|---|
| $TiO_2$ | 54.2 |
| FeO | 23.8 |
| $Fe_2O_3$ | 17.2 |
| $SiO_2$ | 1.1 |
| $Al_2O_3$ | 0.86 |
| MgO | 0.26 |
| CaO | 0.10 |
| MnO | 1.54 |

2000 g. of this ilmenite were treated with 4400 g. of 20% HCl, in a glass flask provided with a stirrer and a reflux condenser, brought to a temperature of 105°–110° C. and kept under stirring for 4 hours. At the end of this pre-leaching, the suspension or slurry thus obtained was cooled and filtered. The resulting filter cake was washed with water (3500 ml.) and dried. 1500 g. of dry product were obtained having the same particle size as that of the starting ore and a specific surface of 32 m.$^2$/g., with a $TiO_2$ content of 71.2% and a total Fe content of 16.5%.

1000 g. of this pre-leached ilmenite were fed, at room temperature, into a discontinuous fluid bed reactor (φ=75 mm.) and brought to the temperature of 800° C. in a hydrogen atmosphere (1200 Nl./h.) in 20 minutes. In this way a reduced product is obtained wherein the total Fe is distributed thus: 94% $Fe^{++}$, 5% as metallic Fe, 1% as $Fe^{++}$.

500 g. of the reduced ore were finally leached, operating in a flask as for the first leaching, with 800 g. of 22% HCl, at a temperature of 90–95 C. for the first two hours and 105°–110° C. for another two hours.

At the end of the leaching, after cooling and filtering of the suspension, 490 g. of a moist cake were obtained which was then washed and dried. 385 g. of a dry product were obtained, having the following characteristics:

Specific surface=4.3 m.²/g.

Particle size

| Mm.: | Percent |
|---|---|
| >0.25 | 7.2 |
| 0.25–0.149 | 49.5 |
| 0.149–0.102 | 39.2 |
| 0.102–0.075 | 2.7 |
| 0.075–0.044 | 1.1 |
| <0.044 | 0.3 |

Composition

| Total: | |
|---|---|
| $TiO_2$ | 95.7 |
| Fe | 1.0 |
| $SiO_2$ | 2.1 |
| $Al_2O_3$ | 0.62 |
| MgO | 0.10 |
| CaO | 0.02 |
| MnO | 0.72 |

EXAMPLE 2

An ilmenite coming from Norway was treated. This had the following characteristics:

Specific surface=0.4 m.²/g.

Particle size

| Mm.: | Percent |
|---|---|
| >0.25 | 0.5 |
| 0.25–0.149 | 8.8 |
| 0.149–0.102 | 20.2 |
| 0.102–0.075 | 18.5 |
| 0.075–0.044 | 23.8 |
| <0.044 | 28.2 |

Composition

| Total: | |
|---|---|
| $TiO_2$ | 45 |
| FeO | 35 |
| $Fe_2O_3$ | 12.5 |
| CaO | 0.27 |
| MgO | 5.15 |
| $SiO_2$ | 2.5 |
| $Al_2O_3$ | 0.51 |
| MnO | 0.32 |

2000 g. of this ilmenite were treated with 4200 g. of 22% HCl in a flask as in Example 1, at a temperature of 105°–110° C. for 4 hours. After cooling and filtration, the separated cake was washed with (3200 ml.) and dried. 1250 g. of a dry product were thus obtained, having 70.4% of $TiO_2$ and 13.2% of total Fe, with a specific surface of 29 m.²/g.

The product thus obtained was reduced in a discontinuous fluid bed reactor with CO, at a temperature of 800° C. for 22 minutes. The iron content in the reduced product was as follows: Total Fe=13.8%; $Fe^{++}$=12.8%; metallic Fe=traces.

500 g. of this product were treated in a flask as for the pre-leaching, with 600 g. of 25% HCl at a temperature of 105°–110° C. for 2 hours.

At the end of the leaching, after cooling and filtration, the cake, which was washed and dried, was separated, thus obtaining 400 g. of a dry product having the following composition:

| Total: | Percent |
|---|---|
| $TiO_2$ | 90.80 |
| Fe | 0.95 |
| MgO | 0.45 |
| CaO | 0.03 |
| $SiO_2$ | 4.7 |
| $Al_2O_3$ | 0.23 |
| MnO | 0.10 |

The particle size of the synthetic rutile product was the following:

| Mm.: | Percent |
|---|---|
| >0.25 | 0.8 |
| 0.25–0.149 | 11.0 |
| 0.149–0.102 | 23.5 |
| 0.102–0.075 | 15.2 |
| 0.075–0.044 | 25.3 |
| <0.044 | 24.2 | and was very near to that of the starting ilmenite ore.

What is claimed is:

1. A process for the preparation of synthetic rutile by leaching ilmenite with aqueous hydrochloric acid, wherein:

the ilmenite is pre-leached, for a time between 2 and 5 hours, at a temperature between 90° and 110° C., with 15% to 25% aqueous hydrochloric acid, in an amount corresponding to 120% to 180% of the stoichiometric amount calculated with respect to the ferrous oxide and the other metallic oxides which may be attacked, in order to solubilize the ferrous oxide and the obtained suspension is filtered or centrifuged, thus obtaining a solid phase which is washed;

the washed solid phase of the preceding stage, after drying and pre-heating, is treated in a fluid bed reactor, for 10 to 120 minutes, with a reducing gas, containing $H_2$ and/or CO, at a temperature of 650° C. to 900° C., in order to reduce to ferrous oxide all the higher iron oxides therein;

the reduced ore is leached, for a time between 2 and 4 hours, at a temperature between 80° and 110° C., with 15% to 25% aqueous hydrochloric acid, in an amount corresponding to 150% to 200% of the stoichiometric amount calculated with respect to the amount of the metals present, titanium excepted, in order to solubilize the ferrous oxide resulting from the reduction treatment, and the suspension thus obtained is filtered or centrifuged, thus obtaining a solid phase which, after washing and drying, forms the synthetic rutile product containing more than 90% of titanium dioxide.

2. A process according to claim 1, wherein the reducing gas contains $H_2$, CO, $H_2O$ and $CO_2$, with a molar ratio $H_2+CO/H_2O+CO_2$ higher than 2.

3. A process according to claim 2, wherein the reducing gas is produced directly in the reducing reactor by partial combustion of fuel oil or natural gas with air or oxygen, said fuel oil or natural gas and air or oxygen being injected directly into the reactor.

References Cited

UNITED STATES PATENTS

| 2,441,856 | 5/1948 | Turner et al. | 23—202 R |
| 2,804,375 | 8/1957 | Kamlet | 23—202 R |
| 3,193,376 | 7/1965 | Lo et al. | 23—202 R X |
| 3,529,931 | 9/1970 | Moklebust | 75—101 R X |
| 3,597,189 | 8/1971 | Sinha et al. | 75—101 R X |
| 3,649,243 | 3/1972 | Williams et al. | 75—101 R X |

EDWARD STERN, Primary Examiner

U.S. Cl. X.R.

23—312 R; 75—1, 101; 423—488, 632